(12) United States Patent
Carlson et al.

(10) Patent No.: US 8,808,495 B2
(45) Date of Patent: Aug. 19, 2014

(54) MODIFIED DIPHENYLMETHANE DIISOCYANATE-BASED ADHESIVES

(75) Inventors: Brian W. Carlson, Woodbury, MN (US); Dorian Nelson, St. Paul, MN (US); Wayne G. Eklund, Scandia, MN (US)

(73) Assignee: H.B. Fuller Company, St. Paul, MN (US)

( * ) Notice: Subject to any disclaimer, the term of this patent is extended or adjusted under 35 U.S.C. 154(b) by 36 days.

(21) Appl. No.: 13/444,585

(22) Filed: Apr. 11, 2012

(65) Prior Publication Data

US 2012/0263836 A1    Oct. 18, 2012

Related U.S. Application Data

(60) Provisional application No. 61/475,825, filed on Apr. 15, 2011.

(51) Int. Cl.
*B32B 37/12* (2006.01)
*B32B 27/40* (2006.01)
*B65D 85/00* (2006.01)
*C09J 175/04* (2006.01)

(52) U.S. Cl.
USPC .............. 156/331.7; 426/127; 428/423.1; 524/873

(58) Field of Classification Search
USPC ............. 156/331.7; 426/127; 524/873; 428/423.1
See application file for complete search history.

(56) References Cited

U.S. PATENT DOCUMENTS

| | | |
|---|---|---|
| 4,738,991 A | 4/1988 | Narayan |
| 5,319,053 A | 6/1994 | Slack et al. |
| 5,319,054 A | 6/1994 | Slack et al. |
| 5,610,260 A | 3/1997 | Schmalstieg et al. |
| 5,663,272 A | 9/1997 | Slack et al. |
| 6,242,556 B1 | 6/2001 | Markusch et al. |
| 2007/0129525 A1* | 6/2007 | Eichelmann et al. ........... 528/44 |
| 2010/0010156 A1 | 1/2010 | Kollbach et al. |
| 2010/0186897 A1 | 7/2010 | Barker et al. |
| 2010/0330238 A1 | 12/2010 | Wintermantel et al. |
| 2011/0004241 A1 | 1/2011 | Wintermantel et al. |

FOREIGN PATENT DOCUMENTS

| | | |
|---|---|---|
| DE | 10027566 | 12/2011 |
| WO | WO2012/078331 | 6/2012 |

OTHER PUBLICATIONS

MSDS for ISONATE M143, Dow Chemical.*

* cited by examiner

*Primary Examiner* — Michael Orlando
*Assistant Examiner* — Daniel Lee
(74) *Attorney, Agent, or Firm* — Bin Su; Kirsten Stone

(57) ABSTRACT

Adhesive compositions using modified diphenylmethane diisocyanate are disclosed along with methods and articles using the adhesive compositions. The adhesive compositions are especially suited for making flexible laminates for use in food packaging.

10 Claims, No Drawings

MODIFIED DIPHENYLMETHANE DIISOCYANATE-BASED ADHESIVES

CROSS-REFERENCE TO RELATED APPLICATIONS

This application claims the benefit of U.S. Provisional Application No. 61/475,825, filed Apr. 15, 2011 and incorporated herein.

BACKGROUND OF THE INVENTION

Isocyanate-based adhesives can be used to manufacture laminates for use in flexible packaging. These adhesives are curable two-part compositions where a polyol (Part A) and an isocyanate-terminated polyurethane prepolymer (Part B) are mixed immediately before the laminating process, and are used to adhere superimposed layers of substrates. Flexible packaging is particularly useful as food packaging.

SUMMARY OF THE INVENTION

It has been found that diphenylmethane diisocyanate (MDI) that has been modified can be used to create adhesives that produce low levels of extractable primary aromatic amines (PAA), are easy to process, and are effective adhesives for flexible packaging laminates.

In one aspect, the present disclosure relates to a laminating adhesive composition, which includes Part A, a first polyol; and Part B, an isocyanate-terminated polyurethane prepolymer. The prepolymer includes a reaction product of a second polyol, and at least one modified diphenylmethane diisocyanate selected from the group consisting of a carbodiimide-modified diphenylmethane diisocyanate, an allophanate-modified diphenylmethane diisocyanate, a biuret-modified diphenylmethane diisocyanate, a polymeric diphenylmethane diisocyanate, and combinations thereof.

In one embodiment, the first polyol has a viscosity of no greater than 25,000 millipascal second (mPas) at 25° C.±5° C.

In one embodiment, the isocyanate-terminated polyurethane prepolymer is a liquid at an ambient temperature.

In one embodiment, the isocyanate-terminated polyurethane prepolymer has a viscosity of no greater than 25,000 mPas at 25° C.±5° C.

In one embodiment, the prepolymer includes no greater than 0.5% by weight of 2,2'-diphenylmethane diisocyanate and no greater than 10% by weight of 2,4'-diphenylmethane diisocyanate.

In one embodiment, the adhesive composition is substantially free of aliphatic and cycloaliphatic isocyanates and their oligomers In one embodiment, the adhesive composition exhibits a PAA Food Migration Value that is less than 50% of the PAA Food Migration Value exhibited by the control within 3 days or less from lamination according to herein described PAA Extraction Test method.

In another aspect, the present disclosure relates to a method of making a flexible laminate. The laminate includes at least a first flexible substrate and a second flexible substrate. The method includes applying any one of the aforementioned adhesive compositions to a surface of the first substrate to form an adhesive bearing surface of the first substrate, and contacting a surface of the second substrate with the adhesive-bearing surface of the first substrate to form the laminate.

In another aspect, the present disclosure relates to a laminate for flexible packaging. The laminate includes a first flexible substrate, a second flexible substrate, and an adhesive composition laminated between the first and the second substrates. The adhesive composition includes a reaction product of Part A, a first polyol; and Part B, an isocyanate-terminated polyurethane prepolymer that includes a reaction product of a second polyol and at least one modified diphenylmethane diisocyanate selected from the group consisting of a carbodiimide-modified diphenylmethane diisocyanate, an allophanate-modified diphenylmethane diisocyanate, a biuret-modified diphenylmethane diisocyanate, a polymeric diphenylmethane diisocyanate, and combinations thereof.

In another aspect, the present disclosure relates to a food package that includes any one of the aforementioned laminates in a form of a food package, and a food product contained inside of the food package.

DETAILED DESCRIPTION OF THE INVENTION

The present disclosure relates to adhesive compositions, laminates, packaged food articles, and methods of making laminates using adhesive compositions that include a prepolymer prepared using modified diphenylmethane diisocyanate. Adhesive compositions using the disclosed modified diphenylmethane diisocyanate create laminated products that produce low levels of extractable primary aromatic amines (PAA), which makes the laminated products especially suitable for food packaging.

Adhesive Composition

The adhesive composition is a two-part composition that includes a Part A, which is a polyol, and a Part B, which is an isocyanate-terminated polyurethane prepolymer. The two parts, the Part (A) polyol and the Part (B) prepolymer, are kept separate prior to the application, and are mixed immediately before the application in the laminating process. Upon laminating and curing, an adhesive bond forms that adheres the superimposed layers of substrate materials together.

The polyol (Part A) and the prepolymer (Part B) are blended together immediately prior to the laminating process such that the equivalent ratio of isocyanate groups from the prepolymer (Part B) to the hydroxyl groups from the polyol (Part A) is in a range from about 1.0:1.0, or from about 1.05:1.0, or from about 1.1:1.0 to about 1.6:1.0, or to about 1.5:1.0, or to about 1.4:1.0.

Some regulatory agencies limit the amount of extractable primary aromatic amines (PAA) in applications that come into contact with people. One such application is in food packaging. Agencies are concerned about the level of the extractable PAA because it can migrate into food that is later consumed by people. Accordingly, agencies impose limits on how much extractable PAA can migrate into food.

Conventional solventless isocyanate-based adhesives are useful in making flexible packaging laminates for food packaging. However, these isocyanate-based adhesives can produce high levels of extractable PAA through the reaction of monomeric aromatic diisocyanates with water. For example, 4,4'-diphenylmethane diisocyanate (4,4'-MDI, a monomeric aromatic diisocyanate) can react with water to form 4,4-diphenylmethane diamine (4,4'-MDA), which is a PAA. This reaction is shown below:

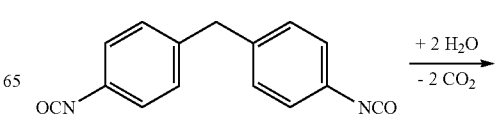

-continued

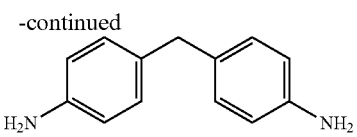

When water reacts with a monomeric aromatic diisocyanate (e.g., an MDI) to form PAA during the curing of the adhesive, the PAA can gradually be consumed by its continuing reaction with isocyanates that are still present in the adhesive. Acidic water in foods that come into contact with the laminate can diffuse into the adhesive and react with any residual monomeric aromatic diisocyanates to form PAA. Also, any monomeric aromatic diisocyanates that diffuses through the laminate can also react with the acidic water and form PAA. The PAA formed in any of these manners and extracted into food is called extractable PAA. Food simulants, such as 3% aqueous acetic acid, are used to determine the amount of extractable PAA. As the monomeric aromatic diisocyanates are consumed during the curing of the adhesive, the amount of extractable PAA will become smaller and smaller or in other words decay. A fast rate of PAA decay is desirable for food packaging applications.

In some embodiments, the disclosed adhesive composition exhibits a PAA Food Migration Value that is no greater than 50%, or no greater than 30%, or no greater than 15%, relative to that of the control after 3 days, or after 2 days, or even after 1 day from the time of the lamination according to herein described PAA Extraction Test method. In some embodiments, the disclosed adhesive composition is substantially free of extractable PAA after 3 days, or after 2 days, or after 1 day from the time of the lamination according to herein described PAA Extraction Test method. In some embodiments, the disclosed adhesive composition is free of extractable PAA after 3 days, or after 2 days or after 1 day from the time of the lamination according to herein described PAA Extraction Test method.

In addition to producing low extractable PAA levels and having rapid PAA decay, the disclosed adhesive composition has additional advantages. For example, the adhesive composition is substantially free of a solvent, such as no greater than 1% solvent. In some embodiments, the adhesive composition is solventless, therefore, does not include volatile organic compounds (VOCs).

The adhesive composition cures quickly and also has a workable viscosity and pot life. Finally, the adhesive composition provides a strong adhesive bond that is resistant to heat, humidity, and chemicals. In some embodiments for food application, the components of the adhesive composition are made exclusively of materials that are acceptable for indirect food contact according to the Food and Drug Administration (FDA) guidelines 21 CFR 175.105. Thus, the adhesive composition is safe to be used for making laminates for packaging food.

Part A—Polyol

Polyol in Part A of the adhesive composition may also be referred to as a first polyol.

Suitable polyols in Part A include, e.g., dials, triols and combinations thereof. Preferred polyols include polyester polyols, polyether polyols, polyolefin dials, polydiene block polyols, and combinations thereof. Preferred polyols have a functionality of at least about 1.5, or at least about 2, or at least about 3, and no greater than about 4, or no greater than about 3.5. Preferred polyols have a glass transition temperature (Tg) of no greater than 10° C., or even no greater than 0° C., and a number average molecular weight (Mn) of from about 300 g/mole, or about 400 g/mole, or about 500 g/mole to about 12,000 g/mole, or to about 5,000 g/mole. Suitable polyols may have a viscosity of at least about 100 mPas, or no greater than 10,000 mPas, or no greater than 25,000 mPas at 25° C.±5° C.

Useful classes of polyols include, e.g., polyester polyols including, e.g., lactone polyols and the alkyleneoxide adducts thereof, and dimer acid-based polyester polyols, specialty polyols including, e.g., polybutadiene polyols, hydrogenated polybutadiene polyols, polycarbonate polyols, hydroxy alkyl derivatives of bisphenol A (e.g., bis(2-hydroxyethyl)bisphenol A), polyether polyols including, e.g., polythioether polyols, and fluorinated polyether polyols, acrylic polyols, alkylene oxide adducts of polyphenols, polytetramethylene glycols, functional glycerides (e.g., castor oil), polyols based on natural products, (e.g. soybean oil based polyols), and polyhydroxy sulfide polymers.

Useful polyester polyols are prepared from the reaction product of polycarboxylic acids, their anhydrides, their esters or their halides, and a stoichiometric excess polyhydric alcohol. Suitable polycarboxylic acids include dicarboxylic acids and tricarboxylic acids including, e.g., aromatic dicarboxylic acids, anhydrides and esters thereof (e.g. terephthalic acid, isophthalic acid, dimethyl terephthalate, diethyl terephthalate, phthalic acid, phthalic anhydride, methyl-hexahydrophthalic acid, methyl-hexahydrophthalic anhydride, methyl-tetrahydroplithalic acid, methyl-tetrahydrophthalic anhydride, hexahydrophthalic acid, hexahydrophthalic anhydride, and tetrahydrophthalic acid), aliphatic dicarboxylic acids and anhydrides thereof (e.g. maleic acid, maleic anhydride, succinic acid, succinic anhydride, glutaric acid, glutaric anhydride, adipic acid, pimelic acid, suberic acid, azelaic acid, sebacic acid, chlorendic acid, 1,2,4-butanetricarboxylic acid, decanedicarboxylic acid, octadecanedicarboxylic acid, dimeric acid, dimerized fatty acids, trimeric fatty acids, and fumaric acid), and alicyclic dicarboxylic acids (e.g. 1,3-cyclohexanedicarboxylic acid, and 1,4-cyclohexanedicarboxylic acid).

Examples of suitable polyols from which polyester polyols can be derived include aliphatic polyols, e.g., ethylene glycols, propane diols (e.g., 1,2-propanediol and 1,3-propanediol), butane diols (e.g., 1,3-butariediol, 1,4-butanediol, and 1,7-butanediol), 1,3-butenediol, 1,4-butenediol, 1,4-butynediol, pentane diols (e.g., 1,5-pentanediol), pentenediols, pentynediols, 1,6-hexanediol, 1,8-octanediol, 1,10-decanediol, neopentyl glycol, diethylene glycol, triethylene glycol, tetraethylene glycol, polyethylene glycols, propylene glycol, polypropylene glycols (e.g., dipropylene glycol and tripropylene glycol), neopentylglycol, 1,4-cyclohexanedimethanol, 1,4-cyclohexanediol, dimer diols, bisphenol A, bisphenol F, hydrogenated bisphenol A, hydrogenated bisphenol F, glycerol, tetramethylene glycol, polytetramethylene glycol, 3-methyl-1,5-pentanediol, 1,9-nonanediol, 2-methyl-1,8-octanediol, trimethylolpropane, glycerin, pentaerythritol, sorbitol, glucose, and combinations thereof.

Examples of useful polyester polyols include polyglycol adipates, polyethylene terephthalate polyols, polycaprolactone polyols and polycaprolactone triols.

Suitable commercially available polyols include, e.g., polyester polyols available under the DESMOPHEN series of trade designations including, e.g., DESMOPHEN XF-7395-200, DESMOPHEN S-1011-P210, DESMOPHEN 5-1011-110 and DESMOPHEN S-1011-55 from Bayer Material-Science (Pittsburgh, Pa.), dimer acid-based polyester polyols available under the PRIPLAST series of trade designations including, e.g., PRIPLAST 3187, 3190, 3196, and 3197 from UNIQEMA (New Castle, Del.), polybutadiene polyols available under the trade designations POLYBD R-20LM, R-45HT, and R-45M from Cray Valley (Exton, Pa.), and hydrogenated polybutadiene polyols available under the trade designation POLYTAIL from Mitsubishi Chemical Corp. (Japan).

Suitable polyether polyols include the products obtained from the polymerization of a cyclic oxide, e.g., ethylene oxide, propylene oxide, butylene oxide, and tetrahydrofuran, or by the addition of one or more such oxides to polyfunctional initiators having at least two active hydrogens, e.g., water, polyhydric alcohols (e.g., ethylene glycol, propylene glycol, diethylene glycol, cyclohexane dimethanol, glycerol, trimethylol-propane, pentaerythritol and bisphenol A), ethylenediamine, propylenediamine, triethanolamine, and 1,2-propanedithiol. Particularly useful polyether polyols include, e.g., polyoxypropylene diols and triols, poly(oxyethylene-oxypropylene)diols and triols obtained by the simultaneous or sequential addition of ethylene oxide and propylene oxide to appropriate initiators and polytetramethylene ether glycols obtained by the polymerization of tetrahydrofuran.

Part B—Prepolymer

The prepolymer in Part B is an isocyanate-based polyurethane prepolymer that includes a reaction product of a polyol and at least one modified diphenylmethane diisocyanate.

Diphenylmethane diisocyanate is herein also referred to as MDI. It is understood that diphenylmethane diisocyanate (MDI) monomers can be present as a mixture of three isomers, that is, 4,4'-diphenylmethane diisocyanate (4,4'-MDI), 2,4-diphenylmethane diisocyanate (2,4'-MDI), and 2,2'-diphenylmethane diisocyanate (2,2'-MDI).

Modified diphenylmethane diisocyanate is herein also referred to as modified MDI.

Polyol

For the sake of clarity, the polyol in Part A used to form the adhesive may be referred to as a first polyol, and the polyol reacted with the modified MDI to form the prepolymer may be referred to as a second polyol. It is understood that the second polyol used to form the prepolymer can be the same polyol as the first polyol used to form the adhesive composition, or can be a different polyol from the first polyol in Part A used to form the adhesive. The second polyol can be selected from the same list of polyols described above for the polyol (i.e., the first polyol) in Part A. In some embodiments, the second polyol is preferably a polymeric polyol selected from the group consisting of polyester polyols, polyether polyols, polyesterether polyols, and mixtures thereof.

Modified Diphenylmethane Diisocyanate

Modified diphenylmethane diisocyanate (i.e., modified MDI) is a diphenylmethane diisocyanate in which at least about 2% of isocyanate groups have been modified to carbodiimide, or allophanate, or biuret, or polymeric structure.

In some embodiments, from about 2%, or about 4%, or about 6% to about 25%, or about 35%, or about 50% of isocyanate groups in the diphenylmethane diisocyanate have been modified to carbodiimide, or allophanate, or biuret, or polymeric structure.

It is also understood that a modified MDI may include a mixture of isomers of MDI, some of which have been modified to carbodiimide, or allophanate, or biuret, or polymeric structure, and some of which have not been modified, therefore, remain as monomers e.g., 4,4'-MDI, 2,4'-MDI, 2,2'-MDI, or combinations thereof.

In some embodiments, the modified MDI includes no greater than 10% by weight of the 2,4'-MDI, and no greater than 0.5% by weight of the 2,2'-MDI, based on the weight of the modified MDI.

Examples of useful modified MDIs include e.g., carbodiimide-modified diphenylmethane diisocyanate (carbodiimide-modified MDI), allophanate-modified diphenylmethane diisocyanate (allophanate-modified MDI), biuret-modified diphenylmethane diisocyanate (biuret-modified MDI), polymeric diphenylmethane diisocyanate (polymeric MDI), and combinations thereof.

The preparations of various modified MDIs are generally known; and the modified MDIs e.g., carbodiimide-modified MDI, allophanate-modified MDI, biuret-modified MDI, and polymeric MDI can be prepared by known methods and/or are commercially available.

Examples of useful commercially available carbodiimide-modified MDI materials include ISONATE 143L (Dow Chemicals, Midland, Mich.), LUPRANATE® MM103, LUPRANATE® 5143, LUPRANATE® 5240 (BASF Corp., Wyandotte, Mich.), and MONDUR CD (Bayer MaterialScience, Pittsburgh, Pa.).

It is understood that the carbodiimide-modified MDI may contain various amounts of carbodiimide and uretonimine structures.

In some embodiments where the modified MDI is a carbodiimide-modified MDI, it may be desirable to limit the amount of triethylphosphate (TEP) in the adhesive composition. Triethylphosphate may be used in the production of carbodiimide-modified MDI, but may be undesirable in the final adhesive composition. Accordingly, in some embodiments, the carbodiimide-modified MDI contains no greater than 2% by weight, or no greater than 1% by weight, or no greater than 0.25% by weight, or no greater than 0.1% by weight of triethylphosphate. In some embodiments, the carbodiimide-modified MDI is substantially free of triethylphosphate. In some embodiments, the carbodiimide-modified MDI is free of triethylphosphate.

Preferred carbodiimide-modified MDI includes those that contain no greater than 10% by weight of the 2,4'-MDI, and no greater than 0.5% by weight of the 2,2'-MDI, and are substantially free of TEP. In some embodiments, preferred carbodiimide-modified MDI has a percent isocyanate of from about 16% to about 31%.

Examples of useful commercially available allophanate-modified MDI materials include MONDUR® MA-2300, MONDUR® MA-2600, MONDUR® MA-2601, MONDUR® MA-2602, MONDUR® MA-2603, MONDUR® MA-2604, MONDUR® MA-2800, MONDUR® MA-2902, and MONDUR® MA-2903 (Bayer MaterialScience, Pittsburgh, Pa.).

Preferred allophanate-modified MDI materials include those that contain no greater than 10% by weight of the 2,4'-MDI, and no greater than 0.5% by weight of the 2,2'-MDI. In some embodiments, preferred allophanate-modified MDI materials have a percent isocyanate of from about 16% to about 30%.

Exemplary biuret-modified MDI materials include those with the general structure, wherein $R_1$ and $R_2$ can be the same or different, each being either an H, or a linear, or branched, or cyclic alkyl chain having 1 to 12 carbon atoms, provided that R1 and R2 are both not H:

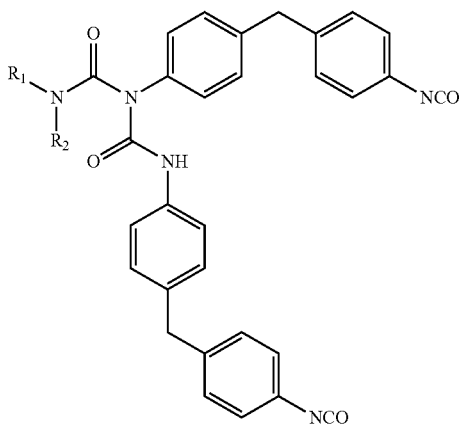

Preferred biuret-modified MDI materials include those that contain no greater than 10% by weight of the 2,4'-MDI and no greater than 0.5% by weight of the 2,2'-MDI. In some embodiments, preferred biuret-modified MDI materials have a percent isocyanate of from about 16% to about 30%.

Exemplary polymeric MDI materials include MONDUR 1441, MONDUR 1479, MONDUR 1489, MONDUR 1508, MONDUR 1509, MONDUR 1469, MONDUR 486, MONDUR 448, MONDUR MRS, MONDUR MR, MONDUR MR Light, MONDUR 489, MONDUR 582, MONDUR MRS-5, MONDUR MR-5, MONDUR MRS-4, MONDUR MRS-20, and MONDUR MRS-2 (Bayer MaterialScience, Pittsburgh, Pa.).

Preferred polymeric MDI materials include those that contain no greater than 10% by weight of the 2,4'-MDI, no greater than 0.5% by weight of the 2,2'-MDI, and a functionality of from about 2.1 to about 2.9. In some embodiments, polymeric MDI materials have a percent isocyanate of from about 25% to about 33%.

Conventionally, an isocyanate-based polyurethane prepolymer made from a diphenylmethane diisocyanate (i.e., MDI) that contains a high level (e.g., at least about 90%) of the 4,4'-MDI and has a percent isocyanate of about 8% or greater tends to crystallize during storage even at room temperature. At temperatures below room temperature, crystallization becomes even more likely or occurs more quickly.

To mitigate or eliminate the crystallization of the prepolymer, one attempt is to use a diphenylmethane diisocyanate (i.e., MDI) material that contains a relatively low level (e.g., <70%) of the 4,4'-MDI to make the prepolymer. Such an MDI material, however, would also contain relatively high level (e.g., >30%) of the 2,4'-MDI as well as relatively high level (e.g., >0.5%) of the 2,2'-MDI. As a result, the adhesives prepared using such a prepolymer would produce high levels of extractable PAA.

When using a modified MDI e.g., a carbodiimide-modified MDI, an allophanate-modified MDI, a biuret-modified MDI, a polymeric MDI, or a combination thereof to prepare a prepolymer, the prepolymer is resistant to crystallization at low temperatures. Preferably, the prepolymer does not crystallize under variable storage conditions, making it easier to store and less likely to be discarded due to the crystallization.

The prepolymer preferably has a final percent isocyanate of from about 8%, or from about 10%, or from about 12% to about 22%, or to about 20%, or to about 18%.

The prepolymer may also contain an isomer distribution of the 2,2'-MDI, the 2,4'-MDI, and the 4,4'-MDI monomers. In some embodiments, the prepolymer contains from 0% to about 0.5% by weight of the 2,2'-MDI, from 0% to about 10% by weight of the 2,4'-MDI, and from about 5% by weight to about 65% by weight of the 4,4'-MDI, based on the weight of the prepolymer.

In some embodiments, the prepolymer contains from about 0% to about 0.3% by weight of the 2,2'-MDI, from about 0% to about 6% by weight of the 2,4'-MDI, and from about 5% to about 65% by weight of the 4,4'-MDI, based on the weight of the prepolymer.

In some embodiments, the prepolymer contains from about 0% to about 0.1% by weight of the 2,2'-MDI, from about 0% to about 4% by weight of the 2,4'-MDI, and from about 5% by weight to about 65% by weight of the 4,4'-MDI, based on the weight of the prepolymer.

In some embodiments, the prepolymer is substantially free of the 2,2'-MDI. In some embodiments, the prepolymer is free of the 2,2'-MDI.

The prepolymer is preferably a liquid at ambient temperature. The prepolymer preferably has a viscosity that allows it to be easily processed. In some embodiments, the prepolymer has a viscosity of from about 500 mPas, or about 1,000 mPas, to no greater than 25,000 mPas, or no greater than 20,000 mPas, or no greater than 15,000 mPas at 25'C±5° C.

Other Additives

The adhesive composition may also include other optional additives in either Part A or Part B, which include, e.g., antioxidants, plasticizers, pacifying agents, adhesion promoters, non-reactive resins, ultraviolet light stabilizers, catalysts, catalyst deactivators, theology modifiers, biocides, corrosion inhibitors, dehydrators, organic solvents, colorants (e.g., pigments and dyes), fillers, surfactants, flame retardants, waxes, and mixtures thereof.

Suitable plasticizers include, e.g., phthalates, benzoates, sulfonamides, and mixtures thereof, and epoxidized soybean oil. Useful sources of dioctyl and diisodecyl phthalate include those available under the trade designations JAYFLEX DOP and JAYFLEX DIDP from Exxon Chemical. Useful dibenzoates are available under the trade designations BENZOFLEX 9-88, BENZOFLEX 50 and BENZOFLEX 400 from Velsicol Chemical Corporation. Soybean oil is commercially available, e.g., from Dow Chemical under the trade designation FLEXOL EPO.

Plasticizer, when present, is preferably present in an amount of from about 0.25% by weight to about 10% by weight, no greater than about 5% by weight, no greater than about 3% by weight, or even from about 0.5% by weight to about 2% by weight.

Suitable fillers include, e.g., fumed silica, precipitated silica, talc, calcium carbonates, carbon black, alumina silicates, clay, zeolites, ceramics, mica, titanium dioxide, and combinations thereof. When present, the adhesive preferably includes filler in an amount of at least 0.5% by weight, from about 1% by weight to about 20% by weight, or even from about 2% by weight to about 10% by weight.

The adhesive can optionally include thermoplastic polymers including e.g., ethylene vinyl acetate, ethylene-acrylic acid, ethylene methacrylate and ethylene-n-butyl acrylate copolymers, polyvinyl alcohol, hydroxyethyl cellulose, hydroxylpropylcellulose, polyvinyl methyl ether, polyethylene oxide, polyvinylpyrrolidone, polyethyloxazolines, starch, cellulose esters, and combinations thereof.

Laminate

The laminate of the invention includes at least a first substrate, a second substrate, and any one of the aforementioned adhesive compositions laminated between the two substrates. The first and the second substrates may be the same or a different material.

The laminate may be a multi-layer laminate, which has more than two substrates laminated together with any one of the aforementioned adhesive compositions in between each of the two layers.

The laminate exhibits a PAA Food Migration Value that is less than 50% of the PAA Food Migration Value exhibited by the control within 3 days or less from lamination according to herein described PAA Extraction Test method.

The disclosed adhesive composition can be used with a variety of substrates and in particular flexible films including, e.g., metal foils (aluminum foil), polymer films and metalized polymer films prepared from polymers including, e.g., polyolefins (e.g., polypropylene, polyethylene, low density polyethylene, linear low density polyethylene, high density polyethylene, polypropylene, and oriented polypropylene; copolymers of polyolefins and other comonomers) metalized polyolefins (e.g., metalized polypropylene), metalized polyethylene terephthalate, ethylene-vinyl acetates, ethylene-methacrylic acid ionomers, ethylene-vinyl-alcohols, polyesters, e.g. polyethylene terephthalate, polycarbonates, polyamides, e.g. Nylon-6 and Nylon-6,6, polyvinyl chloride, polyvinylidene chloride, polylactic acid, cellulosics, polystyrene, cellophane, paper, and retortable packaging laminate materials. The thickness of a film may vary, but flexible films typically have a thickness of less than about 0.25 millimeters, e.g. from about 5 micrometers to about 150 micrometers, more typically from about 8 micrometers to about 100 micrometers. The surface of the substrate can be surface treated to enhance adhesion using any suitable method including, e.g., corona treatments, chemical treatments and flame treatments.

Other suitable substrates include, e.g. woven webs, non-woven webs, paper, paperboard, and cellular flexible sheet materials (e.g., polyethylene foam, polyurethane foam and sponge and foam rubber). Woven and non-woven webs can include fibers including, e.g., cotton, polyester, polyolefin, polyamide, and polyimide fibers. The substrate can be constructed to exhibit many useful properties. Preferably the substrate exhibits properties useful for flexible packaging and retortable packaging. Such properties include, e.g., high tensile strength, vapor barrier properties, flexibility, rigidity, resistance to thermal degradation and combinations thereof. The disclosed adhesive compositions are especially suited for manufacturing flexible packaging and in particular flexible food packaging.

Methods of Making and Using

The disclosed adhesive compositions can be used to manufacture flexible laminates. In some embodiments, the adhesive can be used to bond a first and second substrate together. In some embodiments, the adhesive can be used to bond three or more substrates together.

Any suitable method of making flexible laminates can be used. One useful method includes applying the adhesive in the liquid form to a first substrate, e.g., a flexible film, then contacting a second substrate, e.g., a same or different flexible film with the adhesive bearing surface of the first substrate such that the two substrates are bonded together to form a laminate.

In some embodiments, the adhesive composition may be applied using any suitable coating process including, e.g., air knife, trailing blade, spraying, brushing, dipping, doctor blade, roll coating, multi-roll transfer coating, gravure coating, offset gravure coating, rotogravure coating, or combinations thereof. Useful coating temperatures range from about 20° C. to about 75° C. Lower temperatures are preferred during the solventless laminating process in order to extend the working life of the adhesive composition. The coating weight of the adhesive may vary broadly depending on the properties desired of the laminate. Useful adhesive coating weights include, e.g., from about 0.8 grams per square meter (gsm) to about 6.5 gsm, or even from about 0.8 gsm to 2.5 gsm. Once coated, the first film substrate is contacted with a second substrate. The second substrate may be of the same or different material relative to the first substrate. To make a multi-layered laminate, the laminating procedure herein described may be repeated a number of times, so that it is possible to produce laminates which consist of more than two bonded layers. In some embodiments, when manufacturing flexible laminates, the disclosed adhesive composition can be processed on laminator units at line speeds up to about 600 meters/min.

The resulting laminates can be converted into various packaging products, especially food packaging products, e.g., bags, pouches, stand-up pouches, zippered pouches, etc.

Food packaging products exhibit a PAA Food Migration Value that is less than 50% of the PAA Food Migration Value exhibited by the control within 3 days or less from lamination according to herein described PAA Extraction Test method.

Materials used in food packaging have to meet certain regulatory restrictions because of their contact with food. One concern with food packaging is the ability of the food product to extract materials out of the packaging, including the adhesive used in making the packaging, and into the food. Liquid, acidic and oily foods in particular have a tendency to extract materials from the packaging and adhesive into the food. Therefore, the disclosed adhesives are especially useful in manufacturing flexible packaging laminates that are ultimately used to package liquid, acidic or oily food products. Exemplary foods include acidic foods such as ketchup, mustard, and sauces as well as fatty foods like meats and cheeses.

While the disclosed adhesive compositions are useful for making laminates for use in food packaging products, it is understood that they can be used to make laminates that can be used to make other packaging products for a variety of purposes, including packaging for industrial applications, packaging for consumer applications such as cleaning products, cosmetics, and health and beauty products, packaging for agricultural and veterinary applications such as feed, pesticides, and soil, packaging for medical and pharmaceutical applications, and use in photovoltaic structures, flexible electronic assemblies, general industrial laminates, and flexible optical displays.

The present disclosure may be better understood with reference to the following examples. These examples are intended to be representative of specific embodiments of the disclosure and are not intended to be limiting to the scope of the disclosure.

All parts, ratios, percents, and amounts stated herein and in the examples are by weight unless otherwise specified.

EXAMPLES

Test Methods

Viscosity Test

The viscosity of a polyol or a prepolymer is determined using a Brookfield Programmable Rheometer Model DV-III using Spindle 27 and about 10.5 gram (g) of sample material at a temperature of about 25° C.±5° C.

Crystallization Test

The Crystallization Test is used to determine whether a prepolymer material crystallizes or not. About 20-30 g of a liquid prepolymer sample that has a clear appearance is placed in a stainless steel container, which is then purged with nitrogen and closed. The container is placed in a freezer at about −18° C. The appearance (clear, hazy, or solid) of the sample is recorded with time. The container is purged with nitrogen after each opening. The sample passes the Crystallization Test if it still has a clear appearance after 7 days.

PAA Extraction Test

I) Preparation of Laminate

A roll of a laminate is prepared by first mixing together a polyol (Part A) and a prepolymer (Part B) of a two-part adhesive composition in a predetermined stoichiometric ratio, then, applying the mixed adhesive to a first substrate followed by lamination to a second substrate. At least one of the two substrates is a sealant film that is a low density polyethylene having a film thickness of from about 25 microns to about 38 microns. The coat weight of the adhesive is from about 1.6 to about 1.9 grams/square meter (gsm). The laminate is allowed to cure at a temperature of 23° C.±2° C. and a relative humidity of 50%±5%. At predetermined intervals from lamination (e.g., at 1 day, or 2 day, or 3 day . . . ), the laminate is subjected to the PAA Extraction Test Procedure.

For accurate and reproducible results, the dewpoint during the lamination should be from 5° C. to 15° C.

II). Control Adhesive Composition and Control Laminate

A two-part polyurethane adhesive composition is used as a control adhesive, which includes a Part A polyol and a Part B prepolymer. The Part B prepolymer includes a reaction product of diphenylmethane diisocyanate (MDI), which contains approximately equal amounts of 4,4'-MDI and 2,4'-MDI along with from about 1.8% to about 2.5% 2,2'-MDI, and a diethyleneglycol adipate polyester having a hydroxyl number of 210±10. The final percent isocyanate of the prepolymer is about 18%±0.5%. The Part A polyol for the control adhesive is WD4132, which is a polyol with a hydroxyl number of 200±10 and commercially available from H.B. Fuller Company (St. Paul, Minn.). The prepolymer and polyol are mixed at a weight ratio of about 1.2:1.0 to prepare the control adhesive.

A control laminate is prepared according to the Preparation of Laminate using the control adhesive, a sealant film that is a low density polyethylene having a film thickness of from about 25 microns to about 38 microns, and a polyester or polyamide film that has a film thickness of about 12 microns. The control laminate is subjected to the PAA Extraction Test Procedure at the same time and the same test conditions as that for the sample(s) it is being compared to.

III). PAA Extraction Test Procedure

The amount of extractable PAA expressed as PAA Food Migration Value is determined as follows. The outer 5-10 wraps from a roll of a laminate, which is prepared using the same substrates as that of the control laminate, is cut off and discarded. A pouch with an internal contact area of 4 dm$^2$ is then made from the laminate and filled with 200 milliliter (mL) of 3% aqueous acetic acid solution, which is used to simulate food inside of the pouch. The pouch is then sealed and placed in a 70° C. oven for one hour, thereafter, turned over and left in the 70° C. oven for another hour. At that point the pouch is either immediately emptied into a glass container (Extraction Condition A) or placed in a 40° C. oven for additional 238 hours, then emptied into a glass container (Extraction Condition B). The extraction solution is then analyzed for extractable PAA content by high performance liquid chromatography (HPLC) at a wavelength of 235 nm using pure 4,4'-methylenedianiline, 2,4'-methylenedianiline, and 2,2'-methylenedianiline isomers as standards. PAA Food Migration Value is then calculated by normalizing the extractable PAA content from the HPLC testing to an internal surface area of 6 dm$^2$ in contact with 1 kilogram (kg) of foodstuff. This yields a PAA Food Migration Value in microgram/kilogram (or ppb).

PAA Food Migration Value of a tested sample is also compared to that of the control laminate. In doing so, PAA Food Migration Value of the tested sample is converted to a percentage of the PAA Food Migration Value relative to that of the control, which is reported as Percentage of the Control.

The laminate sample to be tested (i.e., the pouch with food simulant) should be prepared and tested at the same time under the same test condition as that of the control laminate.

Peel Adhesion Test

Peel adhesion test is conducted on a laminate at least 7 days from lamination using a Thwing-Albert Friction/Peel Tester Model 225-1. Prior to the test, a laminate is cut into 25 mm×250 mm sample strips. Each of the strips is separated at one end and then peeled at a speed of 300 mm/minute for 20 seconds. The peel strength in g/25 mm is recorded. An average of three (3) samples is reported.

EXAMPLES

Prepolymers

The following prepolymers were used for making the adhesives to be tested in the Examples:

Prepolymer A (using diphenylmethane diisocyanate (i.e., MDI) containing a high level of 4,4'-MDI)

Prepolymer A was prepared by reacting 41.9 parts of VORANOL 220-110N (polyetherpolyol, Dow Chemical) with 58.1 parts of LUPRANATE M (BASF-MDI containing ~98% 4,4'-MDI ~2% 2,4'-MDI and <0.1% 2,2'-MDI). The final percent isocyanate of Prepolymer A was 16.2% and the viscosity at 25° C. was 1020 mPas.

Prepolymer B

Prepolymer B is the prepolymer used to make the Control Adhesive according to the PAA Extraction Test method. Prepolymer B was prepared by reacting 31.3 parts of diethylene glycol adipic acid polyester polyol (Mn: about 500 g/mole) with 68.7 parts of LUPRANATE MI (BASF-MDI containing approximately equal amounts of 4,4'-MDI and 2,4"-MDI, and from about 1.8% to about 2.5% 2,2-MDI). The final percent isocyanate of Prepolymer A was 18% and the viscosity at 25° C. was 2880 mPas.

Prepolymer 1 (Using a Carbodiimide-Modified MDI)

Prepolymer 1 was prepared by reacting 17.2 parts of diethylene glycol adipic acid polyester polyol (Mn: about 500 g/mole) and 16.5 parts of diethylene glycol adipic acid polyester polyol (Mn: about 3000 g/mole) with 66.3 parts of ISONATE 143L (Dow Chemical—carbodiimide-modified MDI containing ~6% 2,4'-MDI, ~0.3% 2,2'-MDI, and 1.5% triethylphosphate). The final percent isocyanate of Prepolymer 1 was 15.7% and viscosity at 25° C. was 9125 mPas.

Prepolymer 2 (Using an Allophanate-Modified MDI)

MONDUR MA2603 (commercially available from Bayer MaterialScience, Pittsburgh, Pa.) was used neat as Prepolymer 2, which includes a reaction product of an allophanate-modified MDI and a polyether polyol. Prepolymer 2 has a percent isocyanate of 16% and a 25° C. viscosity of 1000 mPas.

Prepolymer 3 (Using a Carbodiimide-Modified MDI)

Prepolymer 3 was prepared by reacting 23.2 parts of diethylene glycol adipic acid polyester polyol (Mn: about 500 g/mole) and 7.7 parts of VORANOL 220-110N with 69.1 parts of MONDUR CD (Bayer—carbodiimide-modified MDI containing ~2% 4'-MDI, <0.1% 2,2'-MDI, and no triethylphosphate). The final percent isocyanate of Prepolymer 3 was 15.9% and viscosity at 25° C. was 8590 mPas.

Prepolymer 4 (Using a Carbodiimide-Modified MDI)

Prepolymer 4 was prepared by reacting 23.2 parts of diethylene glycol adipic acid polyester polyol (Mn: about 500 g/mole) and 7.7 parts of VORANOL 220-110N with 69.1 parts of LUPRANATE 5143 (BASF—carbodiimide-modified MDI containing ~6% 2,4'-MDI, ~0.3% 2,2'-MDI, and no triethylphosphate). The final percent isocyanate of Prepolymer 4 was 15.5% and viscosity at 25° C. was 11,575 mPas.

Prepolymer 5 (Using a Carbodiimide-Modified MDI)

Prepolymer 5 was prepared by reacting 23.2 parts of diethylene glycol adipic acid polyester polyol (Mn: about 500 g/mole) and 7.7 parts of VORANOL 220-110N with 69.1 parts of LUPRANATE 5240 (BASF carbodiimide-modified MDI containing ~6% 2,4'-MDI. ~0.3% 2,2'-MDI, and 1.4% triethylphosphate). The final percent isocyanate of Prepolymer 5 was 15.9% and viscosity at 25° C. was 6800 mPas.

Prepolymer 6 (Using an Allophanate-Modified MDI)

An allophanate-modified MDI was prepared by reacting 3.1 parts of 2-propanol (Fisher) and 72.0 parts of LUPRANTE M (BASF-MDI containing ~98% 4,4'-MDI, ~2% 2,4'-MDI, and <0.1% 2,2'-MDI) in the presence of 133 ppm of DABCO T-9 (Air Products) at 120° C. for 90 minutes. After neutralization of the catalyst with 133 ppm of 85% phosphoric acid (Fisher), this allophanate-modified MDI was reacted with 18.6 parts of diethylene glycol adipic acid polyester polyol (Mn: about 500 g/mole) and 6.2 parts of VORANOL 220-110N (Dow) to obtain Prepolymer 6. The final percent isocyanate of Prepolymer 6 was 16.4% and viscosity at 25° C. was 5,710 mPas.

Adhesives

The Control Adhesive was prepared according to the PAA Extraction Test method using Prepolymer B. Each of the Comparative Adhesive A and Adhesives 1-6 was prepared by mixing each of the Prepolymer A and Prepolymers 1-6 herein described in Prepolymer section with WD4132 at a weight ratio of about 1.2:1.0 at ambient temperature.

Example 1

Crystallization Testing of Prepolymers

The crystallization of Prepolymer A, Prepolymer B, and Prepolymers 1-5 were tested according to the Crystallization Test method, and the results are shown in Table 1. Prepolymer A crystallized within one day. All the other prepolymers passed the Crystallization Test.

TABLE 1

Crystallization Test Results

|  | 1 Day | 7 Days |
|---|---|---|
| Prepolymer A | Fail | Fail |
| Prepolymer B | Pass | Pass |
| Prepolymer 1 | Pass | Pass |
| Prepolymer 2 | Pass | Pass |
| Prepolymer 3 | Pass | Pass |
| Prepolymer 4 | Pass | Pass |
| Prepolymer 5 | Pass | Pass |

Example 2

Determination of PAA Food Migration Value
(Polyester to Polyethylene Laminate)

The Control adhesive, Comparative Adhesive A and Adhesives 1 and 2 were used to make laminates. Each laminate was made of a 12 micron polyester film as a first substrate laminated to a 32 micron low density polyethylene as a second substrate at a coat weight of about 1.6 gsm. The dewpoint at the time of lamination was 12° C. The PAA Extraction Test was run using Extraction Condition A. The results are shown in Table 2.

TABLE 2

PAA Food Migration Values (ppb) and Percentage of the Control (% Control)

|  | 2 days | | 3 days | |
|---|---|---|---|---|
|  | (ppb) | % Control | (ppb) | % Control |
| Control Adhesive | 25 | 100 | 16 | 100 |
| Comparative Adhesive A | * | * | * | * |
| Adhesive 1 | 7 | 27 | 3 | 19 |
| Adhesive 2 | * | * | * | * |

* extractable PAA level was not detectable by HPLC.

Table 2 shows that the Comparative Adhesive A, prepared from Prepolymer A that was prepared using an MDI with a high amount of 4,4"-MDI, but low amounts of 2,4'-MDI and 2,2'-MDI, did not produce detectable levels of PAA as measured by HPLC. However, Example 1 has shown that Comparative Prepolymer A crystallizes quickly, which makes it difficult to work with in manufacturing laminates. Table 2 also shows that the Control Adhesive, formed from Prepolymer B that was prepared using an MDI with relatively low amount of 4,4'-MDI, but relatively high amounts of 2,4'-MDI and 2,2'-MDI, exhibited a high PAA Food Migration Value that decayed over a longer period of time. On the other hand, Adhesive 1, prepared from Prepolymer 1 that was prepared using a carbodiimide-modified MDI, exhibited a much lower PAA Food Migration Value that decayed rapidly; and Adhesive 2, prepared from Prepolymer 2 that was prepared using an allophanate-modified MDI, did not produce any detectable level of PAA by HPLC.

Example 3

Determination of PAA Food Migration Value
(Polyester to Polyethylene Laminate)

The Control adhesive and Adhesives 3-5 were used to make laminates. Each of the laminates was made of a 12 micron polyester film laminated to a 32 micron low density polyethylene at a coat weight of about 1.6 gsm. The dewpoint at the time of lamination was 8° C. The PAA Extraction Test was run using Extraction Condition A. The results are shown in Table 3.

TABLE 3

PAA Food Migration Values (ppb) and Percentage of the Control

|  | 1 Day | | 2 Days | | 3 Days | |
|---|---|---|---|---|---|---|
|  | (ppb) | % Control | (ppb) | % Control | (ppb) | % Control |
| Control Adhesive | 50 | 100 | 18 | 100 | 9 | 100 |
| Adhesive 3 | 10 | 20 | 1 | 6 | 1 | 11 |
| Adhesive 4 | 15 | 30 | 2 | 11 | 2 | 22 |
| Adhesive 5 | 10 | 20 | 1 | 6 | 1 | 11 |

Example 3 shows that by using prepolymers that were prepared using carbodiimide-modified MDI, Adhesives 3-5 exhibited very low PAA Food Migration Values compared to that of the Control Adhesive when tested at day 1, day 2, and day 3 from the lamination. The PAA Food Migration Values also quickly decayed to much lower levels at day 2 compared to that of day 1.

Example 4

Determination of PAA Food Migration Value (Polyamide to Polyethylene Laminate)

The Control adhesive and Adhesives 3-5 were used to make laminates. Each of the laminations was made of a 12 micron polyamide film laminated to a 32 micron low density polyethylene at a coat weight of about 1.6 gsm. The dewpoint at the time of lamination was 8° C. The PAA Extraction Test was run using Extraction Condition A. The results are shown in Table 4.

TABLE 4

PAA Food Migration Values (ppb) and Percentage of the Control

|  | 1 Day | | 2 Days | | 3 Days | |
| --- | --- | --- | --- | --- | --- | --- |
|  | (ppb) | % Control | (ppb) | % Control | (ppb) | % Control |
| Control Adhesive | 116 | 100 | 38 | 100 | 17 | 100 |
| Adhesive 3 | 8 | 7 | 1 | 3 | 1 | 6 |
| Adhesive 4 | 29 | 25 | 4 | 11 | 1 | 6 |
| Adhesive 5 | 5 | 4 | 1 | 3 | 2 | 12 |

Example 4 shows that polyamide film is more challenging for PAA decay than polyester films. This is seen in the PAA Food Migration Values for the Control Adhesive in Table 4 versus the values for the Control Adhesive in Table 3. However, even on the more challenging polyamide films, Adhesives 3, 4 and 5, each using a prepolymer prepared with a carbodiimide-modified MDI, still exhibited low PAA Food Migration Values that also decayed rapidly.

Example 5

Determination of PAA Food Migration Value (Polyamide to Polyethylene Laminate)

The Control adhesive and Adhesives 3-5 were used to make laminates. Each of the laminations was made of a 12 micron polyamide film laminated to a 32 micron low density polyethylene at a coat weight of about 1.6 gsm. The dewpoint at the time of lamination was 8° C. The PAA Extraction Test was run using Extraction Condition B. The results are shown in Table 5.

TABLE 5

PAA Food Migration Values (ppb) and Percentage of the Control

|  | 1 Day | | 2 Days | | 3 Days | |
| --- | --- | --- | --- | --- | --- | --- |
|  | (ppb) | % Control | (ppb) | % Control | (ppb) | % Control |
| Control Adhesive | 150 | 100 | 70 | 100 | 46 | 100 |
| Adhesive 3 | 9 | 6 | 1 | 1 | 1 | 2 |
| Adhesive 4 | 31 | 21 | 10 | 14 | 2 | 4 |
| Adhesive 5 | 9 | 6 | * | * | * | * |

* extractable PAA was not detectable by HPLC

The same as in Example 4, Example 5 shows that Adhesives 3, 4 and 5 exhibited lower PAA Food Migration Values as well as rapid decay even with the more difficult polyamide film.

Example 6

Determination of PAA Food Migration Value (Polyester to Polyethylene Laminate)

The Control Adhesive and Adhesive 6 were used to make laminates. Each of laminates was made of a 12 micron polyester film laminated to 32 micron low density polyethylene at a coat weight of about 1.6 gsm. The dewpoint at the time of lamination was 10° C. The PAA Extraction Test was run using Extraction Condition A. The results are shown in Table 6.

TABLE 6

PAA Food Migration Values (ppb) and Percentage of the Control

|  | 1 Day | | 2 Days | | 3 Days | |
| --- | --- | --- | --- | --- | --- | --- |
|  | (ppb) | % Control | (ppb) | % Control | (ppb) | % Control |
| Control Adhesive | 29 | 100 | 9 | 100 | 7 | 100 |
| Adhesive 6 | 3 | 10 | * | * | * | * |

* extractable PAA was not detectable by HPLC

Example 6 shows that by using Prepolymer 6 that was prepared with an allophanate-modified MDI, Adhesive 6 exhibited very low PAA Food Migration Values compared to that of the Control Adhesive when tested at day 1, day 2, and day 3 from the lamination.

Example 7

Adhesion

Laminates of various films and foils at a coat weight of about 1.6 gsm were prepared using Adhesive 3. 180° peel adhesion values in g/25 mm were measured at a peel rate of about 300 mm/min. The peel strength was tested according to the Peel Adhesion test method and is shown in Table 6.

TABLE 7

Peel Strength
Peel Strength (g/25 mm)

| First Film | Second Film | Result |
| --- | --- | --- |
| PET | LDPE | Destruct* |
| MetPET | LDPE | 250 |
| PET | 25 micron Al Foil | 850 |
| OPP | OPP | Destruct |
| MetOPP | OPP | 275 |
| Cellophane | LDPE | Destruct |
| Polyamide | LDPE | Destruct |

*Destruct means that the film tore before the adhesive bond failed
PET = 48 gauge polyester
MetPET = metalized polyester
OPP = 70 gauge oriented polypropylene
MetOPP = metalized oriented polypropylene
LDPE = 32 micron low density polyethylene
Cellophane = 90 gauge Cellophane
Polyamide = 25 micron polyamide Table 6 shows that Adhesive 3 exhibited very good adhesion with a variety of substrates.

The above specification, examples and data provide a complete description of the disclosure. Since many embodiments can be made without departing from the spirit and scope of the disclosure, the invention resides in the claims hereinafter appended.

We claim:

1. A method of making a laminate that comprises a first flexible substrate and a second flexible substrate, said method comprising
applying a two-part adhesive composition to a surface of the first substrate to form an adhesive bearing surface of the first substrate, and
contacting a surface of the second substrate with the adhesive bearing surface of the first substrate to form the laminate,
the two-part adhesive composition comprising
Part A, a first polyol, and
Part B, an isocyanate-terminated polyurethane prepolymer that is a reaction product of a second polyol and a modified diphenylmethane diisocyanate selected from the group consisting of a carbodiimide-modified diphenylmethane diisocyanate, an allophanate-modified diphenylmethane diisocyanate, a biuret-modified diphenylmethane diisocyanate, a polymeric diphenylmethane diisocyanate, and mixtures thereof.

2. The method of claim 1, wherein the laminate exhibits a PAA (primary aromatic amines) Food Migration Value that is less than 50% relative to that of a control within 3 days from the time of lamination.

3. The method of claim 1, wherein the prepolymer comprises from 0 to about 0.5% by weight of 2,2'-diphenylmethane diisocyanate, and from 0 to about 10% by weight of 2,4'-diphenylmethane diisocyanate.

4. The method of claim 1, wherein the first polyol has a viscosity of no greater than 25,000 mPas at 25° C.±5° C.

5. The method of claim 1, wherein the prepolymer is a liquid at an ambient temperature and has a viscosity of no greater than 25,000 mPas at 25° C.±5° C.

6. The method of claim 1, wherein the modified diphenylmethane diisocyanate is a carbodiimide-modified diphenylmethane diisocyanate that contains no greater than 2% by weight triethylphosphate.

7. The method of claim 1, wherein the modified diphenylmethane diisocyanate is a carbodiimide-modified diphenylmethane diisocyanate that contains no greater than 0.5% by weight of 2,2'-diphenylmethane diisocyanate and no greater than 10% by weight of 2,4'-diphenylmethane diisocyanate.

8. The method of claim 1, wherein the modified diphenylmethane diisocyanate is an allophanate-modified diphenylmethane diisocyanate that contains no greater than 0.5% by weight of 2,2'-diphenylmethane diisocyanate and no greater than 10% by weight of 2,4'-diphenylmethane diisocyanate.

9. The method of claim 1, wherein the first and the second polyols are the same or different polyols, each being selected from the group consisting of polyester polyols, polyether polyols, polyesterether polyols, and combinations thereof.

10. The method of claim 1, wherein the first and the second substrates are the same or different material, each being selected from the group consisting of polyethylene, polypropylene, polyester, nylon, surlyn, aluminum foil, cellophane, polylactic acid, metalized polyester, metalized polypropylene, aclar, paper, and combinations thereof.

* * * * *